(12) United States Patent
Lin et al.

(10) Patent No.: US 10,116,586 B2
(45) Date of Patent: Oct. 30, 2018

(54) MANAGING NETWORK BANDWIDTH FOR NETWORK APPLICATIONS

(71) Applicant: TENCENT TECHNOLOGY (SHENZHEN) COMPANY LIMITED, Shenzhen (CN)

(72) Inventors: Jie Lin, Shenzhen (CN); Xi Zhang, Shenzhen (CN); Jing Yang, Shenzhen (CN)

(73) Assignee: TENCENT TECHNOLOGY (SHENZHEN) COMPANY LIMITED, Shenzhen, Guangdong Province (CN)

( * ) Notice: Subject to any disclaimer, the term of this patent is extended or adjusted under 35 U.S.C. 154(b) by 274 days.

(21) Appl. No.: 14/729,694

(22) Filed: Jun. 3, 2015

(65) Prior Publication Data

US 2015/0271094 A1 Sep. 24, 2015

Related U.S. Application Data

(63) Continuation of application No. PCT/CN2013/087748, filed on Nov. 25, 2013.

(30) Foreign Application Priority Data

Dec. 10, 2012 (CN) .......................... 2012 1 0527650

(51) Int. Cl.
*G06F 15/173* (2006.01)
*H04L 12/911* (2013.01)
(Continued)

(52) U.S. Cl.
CPC ........ *H04L 47/748* (2013.01); *H04L 41/0893* (2013.01); *H04L 63/102* (2013.01);
(Continued)

(58) Field of Classification Search
CPC . H04L 47/748; H04L 41/0893; H04L 63/102; H04L 63/145; H04L 63/20
(Continued)

(56) References Cited

U.S. PATENT DOCUMENTS

| 6,757,661 B1 * | 6/2004 | Blaser .................... G06Q 30/02 |
| | | 705/14.54 |
| 6,910,210 B1 * | 6/2005 | Chew .................. G06F 9/44594 |
| | | 707/999.202 |

(Continued)

FOREIGN PATENT DOCUMENTS

| CN | 101431473 A | 5/2009 |
| CN | 101562560 A | 10/2009 |

(Continued)

OTHER PUBLICATIONS

Translation of CN101562560A from espacenet.*

(Continued)

*Primary Examiner* — Liangche Wang
*Assistant Examiner* — Kaylee Huang
(74) *Attorney, Agent, or Firm* — Morgan, Lewis & Bockius LLP (57) ABSTRACT

Various embodiments provide a method and an apparatus for restricting network applications to increase network speed of the local device. A network using scene is identified, and a network application running in the network using scene is restricted using a network speed protecting policy corresponding to the network using scene identified.

18 Claims, 5 Drawing Sheets identifying a network using scene in real time — S201 restricting a network application running in the network using scene using a network speed protecting policy if the network using scene is identifiable — S202

(51) Int. Cl.
  *H04L 29/06* (2006.01)
  *H04L 12/24* (2006.01)
  *H04L 29/08* (2006.01)
(52) U.S. Cl.
  CPC .......... *H04L 63/145* (2013.01); *H04L 63/20* (2013.01); *H04L 63/168* (2013.01); *H04L 67/02* (2013.01); *H04L 67/306* (2013.01)
(58) Field of Classification Search
  USPC ....................................... 709/226, 223, 217
  See application file for complete search history.

(56) References Cited

U.S. PATENT DOCUMENTS

| | | | | |
|---|---|---|---|---|
| 9,098,333 | B1* | 8/2015 | Obrecht | G06F 9/50 |
| 2004/0158631 | A1* | 8/2004 | Chang | H04L 41/24 |
| | | | | 709/224 |
| 2009/0043692 | A1* | 2/2009 | Pippuri | G06F 17/30053 |
| | | | | 705/39 |
| 2009/0113444 | A1* | 4/2009 | Hackborn | G06F 9/461 |
| | | | | 719/312 |
| 2009/0327482 | A1* | 12/2009 | Malhotra | G06F 15/173 |
| | | | | 709/224 |
| 2012/0150785 | A1* | 6/2012 | Subramanya | G06F 9/485 |
| | | | | 706/46 |
| 2013/0047198 | A1* | 2/2013 | Srour | G06F 9/485 |
| | | | | 726/1 |
| 2013/0104048 | A1* | 4/2013 | Pecorilli | G06Q 10/10 |
| | | | | 715/740 |
| 2013/0219176 | A1* | 8/2013 | Akella | H04L 63/0815 |
| | | | | 713/165 |
| 2014/0007106 | A1* | 1/2014 | Weksler | G06F 9/485 |
| | | | | 718/100 |
| 2014/0067997 | A1* | 3/2014 | Saabas | H04L 47/22 |
| | | | | 709/217 |
| 2016/0036722 | A1* | 2/2016 | Obrecht | G06F 9/50 |
| | | | | 709/226 |

FOREIGN PATENT DOCUMENTS

| | | |
|---|---|---|
| CN | 102111333 A | 6/2011 |
| CN | 102209107 A | 10/2011 |
| CN | 102377588 A | 3/2012 |
| WO | 2008039033 A1 | 4/2008 |

OTHER PUBLICATIONS

Chinese Office Action for for Chinese Application 2012105276502, dated Apr. 20, 2016, and English concise explanation thereof.
International Preliminary Report for International Application No. PCT/CN2013/087748, dated Jun. 25, 2015.
Chinese Office Action for Application No. 2012105276502 dated Oct. 10, 2016, and an English concise explanation of relevance thereof.
International Search Report for International Application No. PCT/CN2013/087748, dated Mar. 6, 2014.

* cited by examiner

MANAGING NETWORK BANDWIDTH FOR NETWORK APPLICATIONS

CROSS-REFERENCE TO RELATED APPLICATIONS

This application is a continuation of International Application No. PCT/CN2013/087748, filed Nov. 25, 2013. This application claims the benefit and priority of Chinese Application No. 201210527650.2, filed Dec. 10, 2012. The entire disclosures of each of the above applications are incorporated herein by reference.

FIELD

The present disclosure relates to Web applications, and to restricting network applications.

BACKGROUND

This section provides background information related to the present disclosure which is not necessarily prior art.

Software technology has undergone drastic changes with the rapid growth of the Internet. For example, once-prevailing stand-alone software and local network software are evolving into Internet software. The currently popular Internet "cloud" technology is also driving the development of software towards the direction of "Internet connected". Some general-purpose operating systems such as Windows, etc., do not adopt a completely competition free mechanism for software to access network resources, but allow the software that first seizes the resources to use the resources. Therefore, software that starts later may not function properly because it is unable to obtain adequate resources. For example, online game software is generally sensitive to changes in network bandwidth and network delay, and a sudden increase in network resource occupancy by other applications may greatly affect the fluency of online gaming and may even make the user fall off-line in severe cases.

A conventional method stores a black list of processes whose network speed is restricted in a local device. When a process consumes a large amount of network resources, the process is added into the black list and then ended. As such, network resources previously occupied by the process become available and network speed is increased.

SUMMARY

This section provides a general summary of the disclosure, and is not a comprehensive disclosure of its full scope or all of its features.

Various embodiments provide a method and an apparatus for restricting network applications to increase network speed of a local application.

A method for restricting network applications may include:
  a current network using scene is identified; and
  a network application is restricted using a network speed protecting policy corresponding to the network using scene.

An apparatus for restricting network applications may include a scene identifying module and an application restricting module.

The scene identifying module identifies a current network using scene in real time.

The application restricting module restricts a network application using a network speed protecting policy corresponding to the network using scene identified by the scene identifying module.

The mechanism according to various embodiments monitors the network using scene when a user device accesses the network and adopts a network speed protecting policy corresponding to the scene identified to restrict network applications. Therefore, targeted protection and restriction of network applications are implemented which do not restrict a regular network application, but restrict an application which is automatically started and consumes a large amount of network resources. The network speed of a local application can be increased.

Further areas of applicability will become apparent from the description provided herein. The description and various examples in this summary are intended for purposes of illustration and are not intended to limit the scope of the present disclosure.

DRAWINGS

The drawings described herein are for illustrative purposes of selected embodiments and not all possible implementations, and are not intended to limit the scope of the present disclosure.

Features of the present disclosure are illustrated by way of example and are not limited in the following figures, in which like numerals indicate like elements.

Corresponding reference numerals indicate corresponding parts throughout the several views of the drawings.

DETAILED DESCRIPTION

Example embodiments will now be described more fully with reference to the accompanying drawings.

For simplicity and illustrative purposes, the present disclosure is described by referring mainly to an example thereof. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure. As used herein, the term "includes" means includes but not limited to, the term "including" means including but not limited to. The term "based on" means based at least in part on. Due to characteristics of the Chinese language, quantities of an element, unless specifically mentioned, may be one or a plurality of, or at least one.

Figure 1:
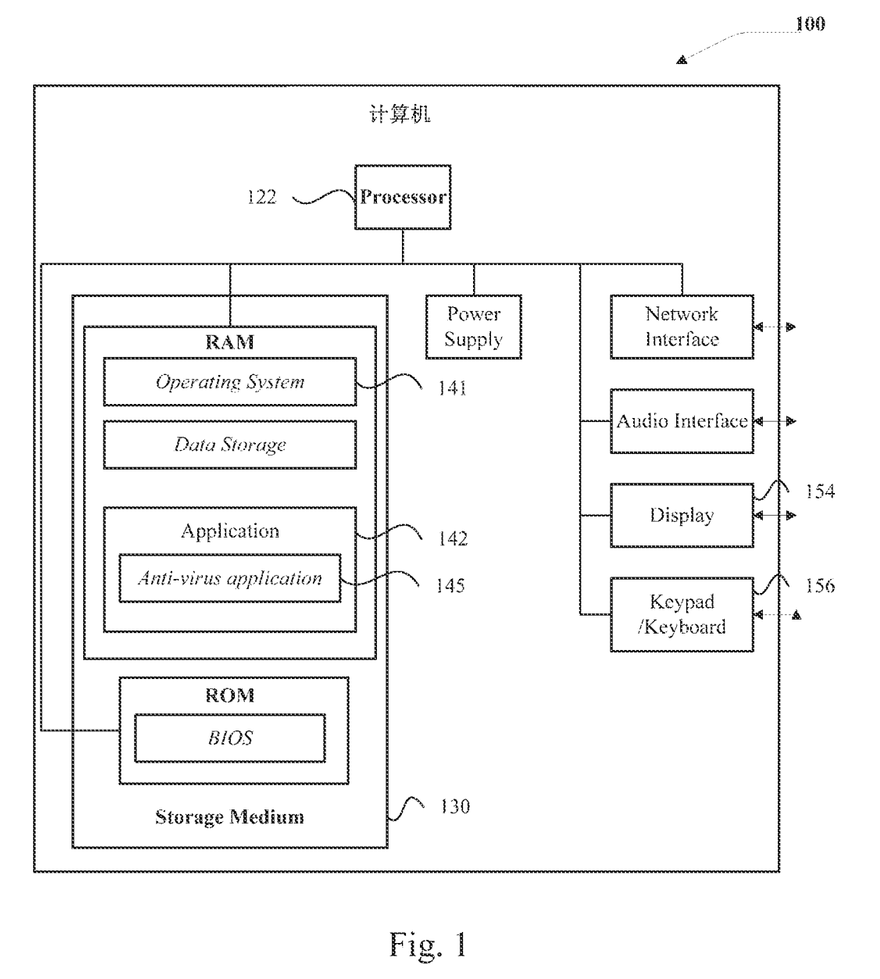
FIG. 1 is a diagram illustrating an example of a computing device according to various embodiments.

According to various embodiments, a computing device may execute methods and software systems of the present application. FIG. 1 is a diagram illustrating an example of a computing device. As shown in FIG. 1, computing device 100 may be capable of executing a method and apparatus of the present disclosure. The computing device 100 may, for example, be a device such as a personal desktop computer or a portable device, such as a laptop computer, a tablet computer, a cellular telephone, or a smart phone. The computing device 100 may also be a server that connects to the above devices locally or via a network.

The computing device 100 may vary in terms of capabilities or features. The present disclosure is intended to cover a wide range of potential variations. For example, the computing device 100 may include a keypad/keyboard 156. It may also include a display 154, such as a liquid crystal display (LCD), or a display with a high degree of functionality, such as a touch-sensitive color 2D or 3D display. Conversely, however, as another example, a web-enabled computing device 100 may include one or more physical or virtual keyboards, and mass storage medium 130.

The computing device 100 may also include or may execute a variety of operating systems 141, including an operating system such as a Windows™ or Linux™, or a mobile operating system, such as iOS™, Android™, or Windows Mobile™. The computing device 100 may include or may execute a variety of possible applications 142, such as a network speed protecting application 145.

The computing device 100 may include one or more non-transitory processor-readable storage media 130 and one or more processors 122 in communication with the non-transitory processor-readable storage media 130. For example, the non-transitory processor-readable storage media 130 may be a RAM memory, flash memory, ROM memory, EPROM memory, EEPROM memory, registers, hard disk, a removable disk, a CD-ROM, or any other form of non-transitory storage medium known in the art. The one or more non-transitory processor-readable storage media 130 may store sets of instructions or units and/or modules that include the sets of instructions for conducting operations described in the present disclosure. The one or more processors may be configured to execute the sets of instructions and perform the operations according to various embodiments.

Figure 2:
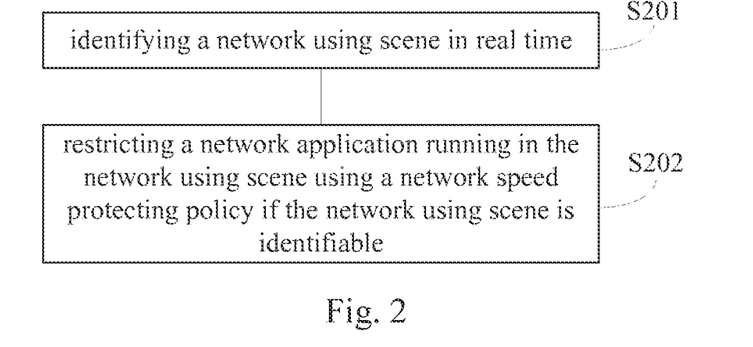
FIG. 2 is a flowchart illustrating a method for restricting network applications according to various embodiments.

FIG. 2 is a flowchart illustrating a method for restricting network applications according to various embodiments. The entity that executes the method may be the network speed protecting application 145 in the computing device 100, e.g., a user device and the like. As shown in FIG. 2, the method may include the following procedures.

Block S201: A current scene of network usage (which is also referred to as network using scene) is identified in real time. Different network using scenes may have different requirements for network resources, e.g., an online video scene and an online game scene generally require more bandwidth or I/O resources and are more sensitive to network delay than a webpage browsing scene. Therefore, the current network using scene is identified before restrictions are applied to network applications. The real-time identifying refers to an act of identifying a network using scene when a user starts using a network.

According to various embodiments, a uniform resource locator (URL) is monitored in real time to identify the network using scene. The URL is an identity describing the address of a webpage or other resources in the Internet. When a user accesses network resources using a browser in the user device, the system may identify the current network using scene by monitoring the URL currently being visited in real time. For example, when it is determined the user is visiting *.youku.com via a browser, it can be determined the network using scene is an online video scene.

According to various embodiments, the network using scene may be identified in real time by monitoring the software the user switches on/off in real time. That is, the switching on/off of software may be used for determining the network using scene. For example, when a user starts a QQ car racing process, it can be determined that the current network using scene is an online game scene.

Network using scenes may be recorded and subdivided from time to time. At times a user may be in two different network using scenes at the same time. For example, a user may be playing an online game while listening to online music. This situation is related to user habits. Therefore, an interface may be provided by the user device for the user to select applications that are allowed to run in a network using scene. A network using scene may be identified by monitoring a URL and switching on/off of applications at the same time.

When a user accesses the network by using a client application, capabilities of the user device may also affect the network speed of an application running in the user device. Restricting the network speed of a user device with low capabilities may result in lower performances of the machine. According to various embodiments in addition to monitoring the network using scene in real time, capabilities including hardware capabilities and software capabilities of the user device are also identified and classified. Hardware capabilities may include capabilities of a CPU, a memory, a video card, a hard drive, and the like of the user device. Software capabilities may include an operating system of the user device. Information on the hardware capabilities and software capabilities is reported to a background module in the user device. The background module may classify the capabilities of the user device into ranks such as high, medium, low, and so on. If a user device is classified to have low capabilities, information may be displayed to prompt the user to switch off a process and/or a service that is occupying network resources when the user device accesses the network.

Block S202: If the scene is identifiable, a network speed protecting policy corresponding to the scene is adopted to restrict network applications running in the network using scene.

According to various embodiments, an auxiliary policy may be adopted to restrict network applications running in the scene and/or a black/white list policy may be used for restricting processes running in the scene. Restricting processes using the black/white list policy may involve classifying processes running in the network using scene. According to various embodiments, when a user accesses the network under a certain network using scene, a network speed protecting application in the user device may monitor usage of network by other processes running in the network using scene and report monitoring results to a background module. The background module classifies the processes. For example, the processes may be classified by using the name of the company producing the software, e.g., Microsoft, Xunlei and the like. Then the processes are further classified by using the name of the product to obtain application categories.

If a process belongs to a known category, the process may be put into a black list or a white list. If a process does not belong to any known category, manual work is necessary to determine whether the process is related to the current network using scene and possibly provide a score. As such, the background module may generate a score for each of all the processes representing the correlation between the process and the network using scene. A process may be added into the white list or the black list according to the score of the process using one or multiple pre-defined thresholds. When a user enters a certain network using scene, the network speed protecting application in the user device may automatically provide a prompt message to suggest the user to adopt a network speed protecting policy associated with the scene.

Processes may be restricted according to the classification result after the processes in a network using scene are classified, i.e., if a process running in a scene belongs to the white list of the scene, the process is not restricted; if the process belongs to the black list of the scene, the process is ended; if the process belongs to a gray list, network resources consumed by the process are restricted. Taking the network using scene being a user playing an online game (e.g., a QQ car racing game) as an example, processes running in the online game scene which are necessary to the running of the online game, e.g., a system process, a gaming process, a gaming sub process, an application accompanying the game (e.g., a game accelerator and the like) and etc., belong to a white list and thus are not restricted by the network speed protecting application in the user device. Processes running in the online gaming scene which are not necessary to the running of the online game and occupy a lot of system resources belong to a black list. The network speed protecting application in the user device may apply a restricting policy to the processes in the black list, e.g., directly ending the process or ending the process and the like. Processes belonging to a gray list, e.g., an unknown process or a third party process that the user does not wish to end, may be restricted according to a network speed restricting policy.

Restricting network applications running in an identifiable network using scene by using an auxiliary policy may involve not restricting the speed of a suspended process, not restricting an application which is manually started by the user, restricting or ending a process running in a user device with low capabilities, and so on. Still taking the user playing an online game as an example, when the user has started an online game process but is not playing the game, i.e., the online game process is suspended; the network speed protecting application does not restrict the network speed of the online game process in the online game scene. When the user has started the online game process and then manually starts another application that also consumes network resources, the network speed protecting application in the user device does not restrict the network speed of the application manually started by the user in the online game scene. When the user has started an online game process, but the user device has low capabilities, processes running in the user device are restricted or ended to ensure there are enough resources for running the online game in the device.

The auxiliary policy and/or the black/white list policy may be network speed protecting policies stored in a local policy center or obtained from a cloud server in real time. According to various embodiments network speed protecting policies in a server in the cloud may be obtained by using a cloud hub.

The various embodiments monitor the network using scene in real time when a user device accesses the network and adopt a network speed protecting policy corresponding to the scene identified to restrict network applications if the scene is identifiable. Therefore, targeted protection and restriction of network applications are implemented, which do not restrict a regular network application, but restrict an application which is automatically started and consumes a large amount of network resources. The network speed of an application can be increased.

Figure 3A:
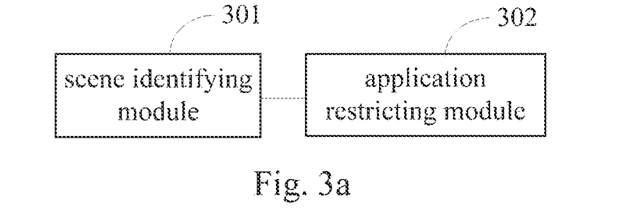
FIGS. 3a, 3b, 3c, 3d, 3e, 3f, 3g, 3h, 3i and 4 are diagrams respectively illustrating various examples of an apparatus for restricting network applications according to various embodiments.

FIG. 3a is a diagram illustrating a structure of an apparatus for restricting network applications according to various embodiments. Only selected features related to the implementation of the mechanism are illustrated for simplicity. The apparatus as shown in FIG. 3a may be a network speed protecting software installed in a user device. The apparatus may include a scene identifying module 301 and an application restricting module 302.

A scene identifying module 301 is configured to identify a current network using scene in real time.

Figure 3B:
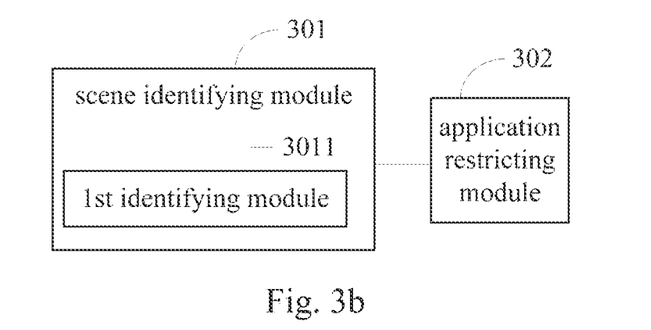

An application restricting module 302 is configured to restrict a network application using a network speed protecting policy corresponding to the network using scene identified by the scene identifying module 301. According to various embodiments, the scene identifying module 301 may include a first identifying module 3011, as shown in FIG. 3b. The first identifying module 3011 is configured to monitor a URL in real time to identify the network using scene.

Figure 3C:
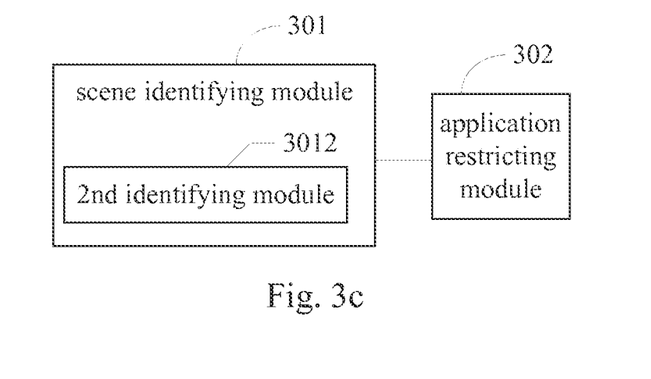

According to various embodiments, the scene identifying module 301 may include a second identifying module 3012, as shown in FIG. 3c. The second identifying module 3012 is configured to monitor switching on/off of an application in real time to identify the network using scene.

Figure 3D:
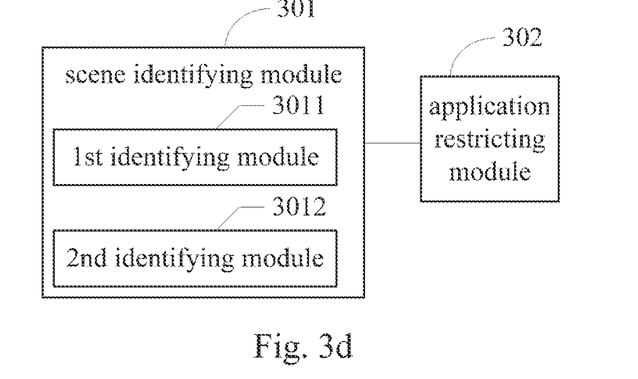

As shown in FIG. 3d, the scene identifying module 301 in the apparatus may include the first identifying module 3011 and the second identifying module 3012.

Figure 3E:
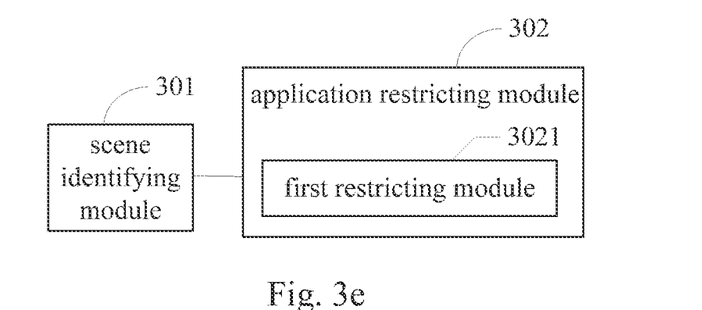

According to various embodiments, the application restricting module 302 may include a first restricting module 3021, as shown in FIG. 3e. The first restricting module 3021 is configured to restrict a network application running in the network using scene by using an auxiliary policy. For example, the auxiliary policy may include any or any combination of: not restrict the speed of a suspended process, not restricting an application which is manually started by the user, restricting or ending a process running in a user device with low capabilities.

Figure 3F:
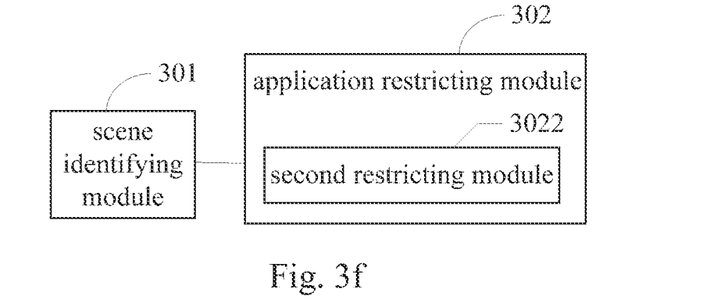

According to various embodiments, the application restricting module 302 may include a second restricting module 3022, as shown in FIG. 3f. The second restricting module 3022 is configured to restrict a process running in the network using scene using a black/white list policy.

Figure 3G:
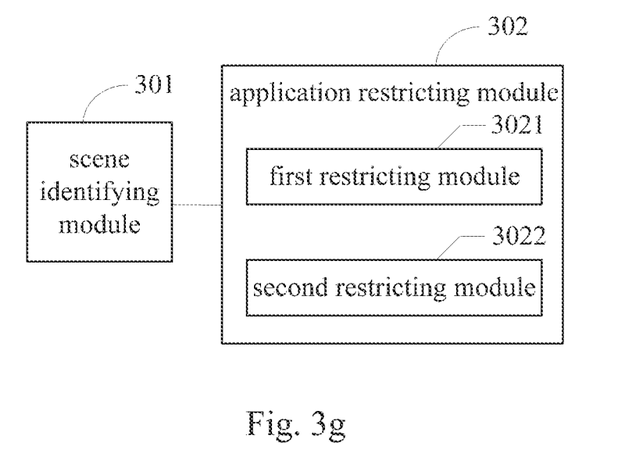

According to various embodiments, the apparatus may include the first restricting module 3021 and the second restricting module 3022, as shown in FIG. 3g.

Figure 3H:
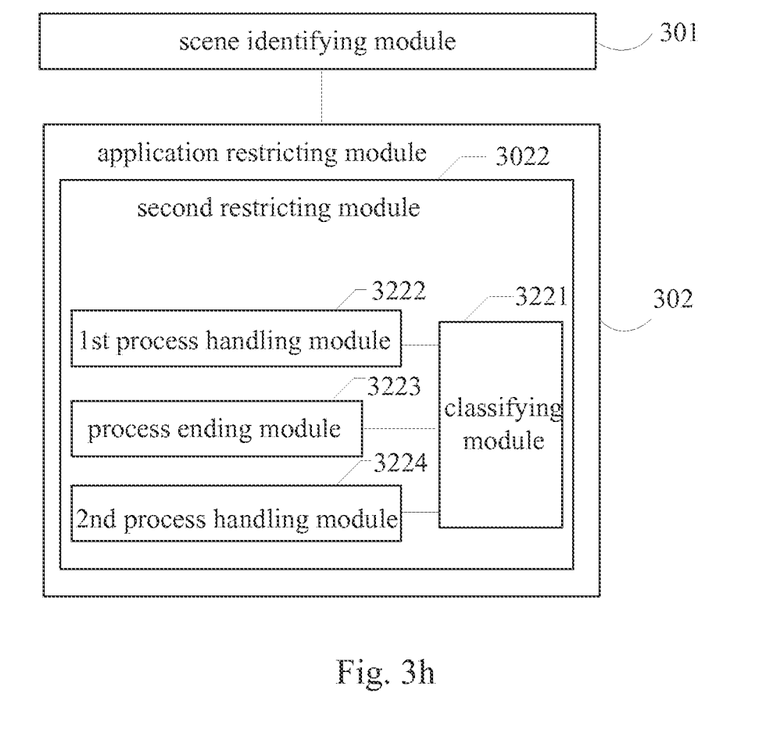
Figure 3I:
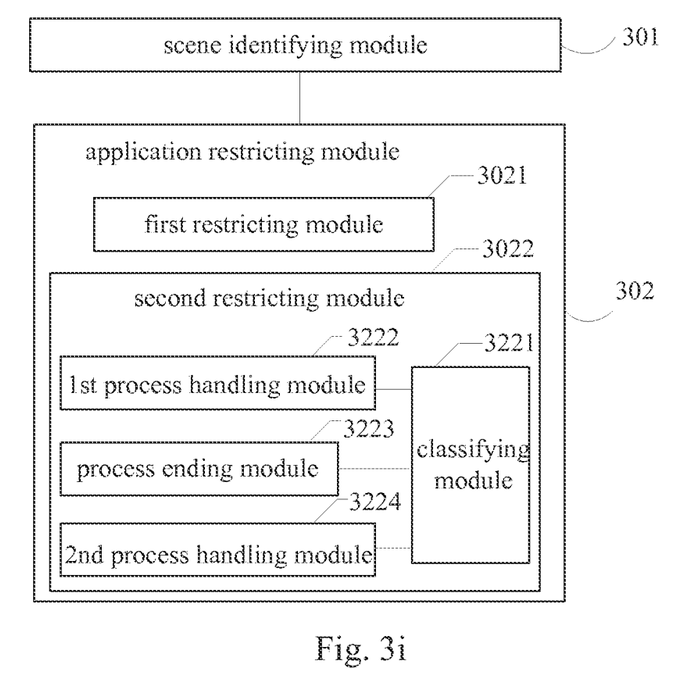

According to various embodiments, the second restricting module 3022 may include a classifying module 3221, a first process handling module 3222, a process ending module 3223, and a second process handling module 3224, as shown in FIG. 3h and FIG. 3i.

The classifying module 3221 is configured to classify processes running in the network using scene.

The first process handling module 3222 is configured to apply no restriction on a process running in the network using scene if the process belongs to a white list.

The process ending module 3223 is configured to end a process running in the network using scene if the process belongs to a black list.

The second process handling module 3224 is configured to restrict a network speed obtained by a process running in the network using scene if the process belongs to a gray list.

Figure 4:
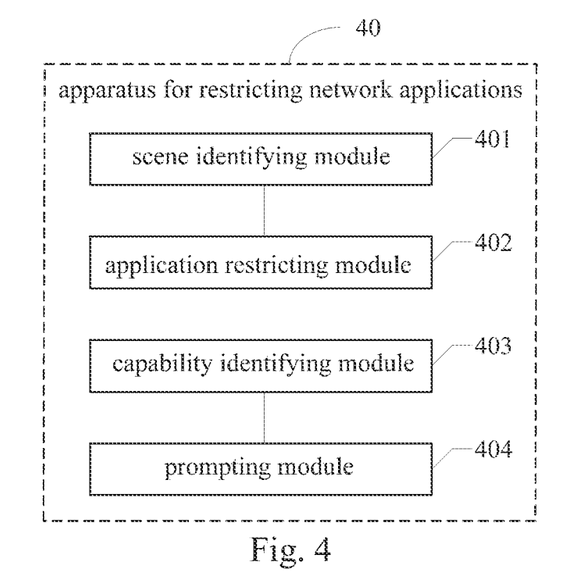

FIG. 4 is a diagram illustrating a structure of an apparatus for restricting network applications according to various embodiments. The apparatus may include a scene identifying module 401, an application restricting module 402, a capability identifying module 403, and a prompting module 404. Functions of the scene identifying module 401 and the application restricting module 402 may be similar to those of the scene identifying module 301 and the application restricting module 302.

The capability identifying module 403 is configured to identify and classify capabilities of a user device. The categories of user device capabilities may include high, medium, and low. The prompting module 404 is configured to prompt the user to end a process and/or a service that consumes network resources if the capability identifying module 403 determines the user device has low capabilities when the user device is accessing the network.

In the above processes and structures, not all of the procedures and modules are necessary. Certain procedures or modules may be omitted according to needs. The order of the procedures is not fixed, and can be adjusted according to needs. The modules are defined based on function simply for facilitating description. In implementation, a module may be implemented by multiple modules, and functions of multiple modules may be implemented by the same module. The modules may reside in the same device or distribute in different devices. The "first", "second" in the above descriptions are merely for distinguishing two similar objects, and have no substantial meanings.

According to various embodiments, a hardware module may be implemented mechanically or electronically. For example, a hardware module may include dedicated circuitry or logic that is permanently configured (e.g., as a special-purpose processor, such as a field programmable gate array (FPGA) or an application-specific integrated circuit (ASIC)) to perform certain operations. A hardware module may also include programmable logic or circuitry (e.g., as encompassed within a general-purpose processor or other programmable processor) that is temporarily configured by software to perform certain operations. The decision to implement a hardware module mechanically, in dedicated and permanently configured circuitry, or in temporarily configured circuitry (e.g., configured by software) may be driven by cost and time considerations.

A machine-readable storage medium is also provided, which stores instructions to cause a machine to execute a method as described herein. A system or apparatus having a storage medium which stores machine-readable program codes for implementing functions of any of the above examples and which may make the system or the apparatus (or CPU or MPU) read and execute the program codes stored in the storage medium. In addition, instructions of the program codes may cause an operating system running in a computer to implement part or all of the operations. In addition, the program codes implemented from a storage medium are written in a storage device in an extension board inserted in the computer or in a storage in an extension unit connected to the computer. In this example, a CPU in the extension board or the extension unit executes at least part of the operations according to the instructions based on the program codes to realize the technical scheme of any of the above examples.

The storage medium for providing the program codes may include floppy disk, hard drive, magneto-optical disk, compact disk (such as CD-ROM, CD-R, CD-RW, DVD-ROM, DVD-RAM, DVD-RW, DVD+RW), magnetic tape drive, Flash card, ROM, and so on. Optionally, the program code may be downloaded from a server computer via a communication network.

The scope of the claims should not be limited by the embodiments set forth in the examples, but should be given the broadest interpretation consistent with the description as a whole.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Reference throughout this specification to "one embodiment," "an embodiment," "specific embodiment," or the like in the singular or plural means that one or more particular features, structures, or characteristics described in connection with an embodiment is included in at least one embodiment of the present disclosure. Thus, the appearances of the phrases "in one embodiment" or "in an embodiment," "in a specific embodiment," or the like in the singular or plural in various places throughout this specification are not necessarily all referring to the same embodiment. Furthermore, the particular features, structures, or characteristics may be combined in any suitable manner in one or more embodiments.

What is claimed is:

1. A method for managing network bandwidth for one or more network applications, comprising:
   identifying a current network using scene before any restrictions are applied to the one or more network applications, comprising:
      detecting a first online application in which a user is engaging on a user device that consumes network bandwidth of the user device;
   after identifying the current network using scene:
      detecting a second online application which is manually started by the user;
      identifying a plurality of processes that consume the network bandwidth of the user device;
      categorizing the plurality of processes into multiple categories associated with the current network using scene, comprising:
         generating a first category including one or more first processes that are required by the first online application;
         generating a second category including one or more second processes that (1) are not required by the first online application or the second online application and (2) compete with the one or more first processes for the network bandwidth of the user device; and
         generating a third category including one or more third processes that do not belong to the first and the second categories; and
      ending the one or more second processes in the second category that are not required by the first online application or the second online application and restricting a network speed used by a third process belonging to the third category, while applying no network bandwidth restriction to (1) the one or more first processes in the first category based on a network speed protecting policy corresponding to the current network using scene and (2) the second application while engaging in the first online application.

2. The method of claim 1, wherein identifying the current network using scene comprises:
   monitoring a uniform resource locator (URL) currently being visited at a browser on the user device to identify the current network using scene; and monitoring starting or ending of an application to identify the current network using scene.

3. The method of claim 1, further comprising:
identifying capabilities of the user device, and identifying a category of the user device in accordance with the identified capabilities; and
in accordance with a determination that the user device is in a low capability category, prompting the user to end a process and/or a service that is occupying the network bandwidth when the user device accesses the network.

4. The method of claim 1,
wherein the method further comprises:
calculating a score of a correlation between a currently-running process and the current network using scene, and adding the currently-running process into the first category in response to a determination that the score exceeds a pre-defined threshold.

5. The method of claim 1, further comprising:
in accordance with a determination that the user has started an online game application but is not currently engaging in the online game application:
applying no restriction to the online game application.

6. An apparatus for managing network bandwidth for one or more network applications, comprising a processor and memory storing computer-readable instructions executable by the processor to:
identify a current network using scene before any restrictions are applied to the one or more network applications, comprising:
detecting a first online application in which a user is engaging on a user device that consumes network bandwidth of the user device;
after identifying the current network using scene:
detect a second online application which is manually started by the user;
identify a plurality of processes that consume the network bandwidth of the user device;
categorize the plurality of processes into multiple categories associated with the current network using scene, comprising:
generating a first category including one or more first processes that are required by the first online application;
generating a second category including one or more second processes that (1) are not required by the first online application or the second online application and (2) compete with the one or more first processes for the network bandwidth of the user device; and
generating a third category including one or more third processes that do not belong to the first and the second categories; and
end the one or more second processes in the second category that are not required by the first online application or the second online application and restricting a network speed used by a third process belonging to the third category, while applying no network bandwidth restriction to (1) the one or more first processes in the first category based on a network speed protecting policy corresponding to the current network using scene and (2) the second application while engaging in the first online application.

7. The apparatus of claim 6, wherein the instructions are executable by the processor to:

monitor a uniform resource locator (URL) currently being visited at a browser on the user device to identify the current network using scene; and
monitor starting or ending of an application to identify the current network using scene.

8. The apparatus of claim 6, wherein the instructions are executable by the processor to:
identify capabilities of the user device and identify a category of the user device in accordance with the identified capabilities; and
in accordance with a determination that the user device is in a low capability category, prompt the user to end a process and/or a service that consumes the network bandwidth when the user device accesses the network.

9. The apparatus of claim 6, wherein the instructions are executable by the processor to:
calculate a score of a correlation between a currently-running process and the current network using scene, and add the currently-running process into the first category in response to a determination that the score exceeds a pre-defined threshold.

10. The apparatus of claim 6, wherein the instructions are executable by the processor to:
in accordance with a determination that the user has started an online game application but is not currently engaging in the online game application:
apply no restriction to the online game application.

11. A non-transitory computer readable storage medium, comprising computer-executable instructions capable of causing a processor to perform actions of:
identifying a current network using scene before any restrictions are applied to the one or more network applications, comprising:
detecting a first online application in which a user is engaging on a user device that consumes network bandwidth of the user device;
after identifying the current network using scene:
detecting a second online application which is manually started by the user;
identifying a plurality of processes that consume the network bandwidth of the user device;
categorizing the plurality of processes into multiple categories associated with the current network using scene, comprising:
generating a first category including one or more first processes that are required by the first online application;
generating a second category including one or more second processes that (1) are not required by the first online application or the second online application and (2) compete with the one or more first processes for the network bandwidth of the user device; and
generating a third category including one or more third processes that do not belong to the first and the second categories; and
ending the one or more second processes in the second category that are not required by the first online application or the second online application and restricting a network speed used by a third process belonging to the third category, while applying no network bandwidth restriction to (1) the one or more first processes in the first category based on network speed protecting policy corresponding to the current network using scene and (2) the second application while engaging in the first online application.

12. The non-transitory computer readable storage medium of claim 11, wherein the identifying the current network using scene comprises:
   monitoring a uniform resource locator (URL) currently being visited at a browser on the user device to identify the current network using scene; and
   monitoring starting or ending of an application to identify the current network using scene.

13. The non-transitory computer readable storage medium of claim 11, further comprising computer-executable instructions capable of causing a processor to perform actions of:
   identifying capabilities of the user device, and identifying a category of the user device in accordance with the identified capabilities; and
   in accordance with a determination that the user device is in a low capability category, prompting the user to end a process and/or a service that is occupying the network bandwidth when the user device accesses the network.

14. The non-transitory computer readable storage medium of claim 11, further comprising computer-executable instructions capable of causing a processor to perform actions of:
   calculating a score of a correlation between a currently-running process and the current network using scene, and adding the currently-running process into the first category in response to a determination that the score exceeds a pre-defined threshold.

15. The non-transitory computer readable storage medium of claim 11, further comprising computer-executable instructions capable of causing a processor to perform actions of:
   in accordance with a determination that the user has started an online game application but is not currently engaging in the online game application:
   applying no restriction to the online game application.

16. The method of claim 1, further comprising:
   in accordance with a determination that the system automatically initiates, without receiving any user input on the user device, a third online application that consumes the network bandwidth of the user device, restricting the third online application.

17. The method of claim 1, wherein the plurality of processes are categorized based on respective names of companies producing software products associated with the respective processes and names of the software products.

18. The method of claim 1, further comprising:
   providing a user interface to prompt the user to allow one or more applications that consume the network bandwidth of the user device to run in the current network using scene.

* * * * *